US006943208B2

(12) United States Patent
Higuchi et al.

(10) Patent No.: US 6,943,208 B2
(45) Date of Patent: Sep. 13, 2005

(54) GOLF BALL

(75) Inventors: Hiroshi Higuchi, Chichibu (JP); Nobuyuki Kataoka, Chichibu (JP); Hiroyuki Nagasawa, Chichibu (JP); Atsushi Nanba, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/191,793

(22) Filed: Jul. 10, 2002

(65) Prior Publication Data

US 2003/0207999 A1 Nov. 6, 2003

(30) Foreign Application Priority Data

Apr. 30, 2002 (JP) ....................................... 2002-128221

(51) Int. Cl.[7] ................................................ A63B 37/06

(52) U.S. Cl. ......................... 524/399; 524/88; 524/225; 524/318; 524/385; 524/394; 525/263; 525/265; 525/274; 473/371; 473/372; 473/377

(58) Field of Search .......................... 524/88, 225, 318, 524/385, 394, 399; 525/263, 265, 274; 473/371, 372, 377

(56) References Cited

U.S. PATENT DOCUMENTS

| | | | | | |
|---|---|---|---|---|---|
| 3,839,250 | A | | 10/1974 | Ehrend et al. | |
| 4,546,980 | A | | 10/1985 | Gendreau et al. | |
| 4,683,257 | A | | 7/1987 | Kakiuchi et al. | |
| 4,692,497 | A | * | 9/1987 | Gendreau et al. | 525/263 |
| 4,770,422 | A | | 9/1988 | Isaac | |
| 4,929,678 | A | | 5/1990 | Hamada et al. | |
| 4,955,613 | A | | 9/1990 | Gendreau et al. | |
| 5,018,740 | A | * | 5/1991 | Sullivan | 473/372 |
| 5,082,285 | A | | 1/1992 | Hamada et al. | |
| 5,683,773 | A | * | 11/1997 | Kemper | 428/36.91 |
| 6,113,831 | A | | 9/2000 | Nesbitt et al. | |
| 6,194,505 | B1 | | 2/2001 | Sone et al. | |
| 6,277,924 | B1 | | 8/2001 | Hamada et al. | |
| 6,312,346 | B1 | | 11/2001 | Sugimoto | |
| 6,394,915 | B1 | * | 5/2002 | Nesbitt | 473/378 |
| 6,426,448 | B1 | * | 7/2002 | Booth et al. | 800/312 |
| 2001/0053808 | A1 | | 12/2001 | Kataoka | |
| 2003/0216193 | A1 | * | 11/2003 | Graves et al. | 473/351 |
| 2004/0019149 | A1 | | 1/2004 | Higuchi et al. | |

FOREIGN PATENT DOCUMENTS

| | | |
|---|---|---|
| JP | 11-035633 | 2/1999 |
| JP | 11-319148 A | 11/1999 |

OTHER PUBLICATIONS

AKZO product data sheet for Perkadox 14.*

U.S. Appl. No. 60/375,980.*

Lancaster Synthesis Product Details of Benzamidophenyl disulfide.*

Struktol Product Literature for Struktol A50, WB16, WA48A.*

Thain, Science and Golf IV, 2002; pp. 319–327.*

Ashford's Dictionary of Industrial Chemicals, 1995; pges 839,840,921,963.*

Mark R. Mason et al.; "Hydrolysis of Tri–tert–butylalumimum: The First Structural Characteristization of Alkylalumoxanes $[(R_2Al)_2O]_n$ and$(RAIO)_n$"; American Chemical Society; vol. 115; No. 12, 1993; pp. 4971–4984.

C. Jeff Harlan et al.; "Three–Coordinate Alumimum Is Not A Prerequisite for Catalytic Activity In The Zirconocene-Alumoxane Polymerization of Ethylene"; American Chemical Society, vol. 117, No. 24; 1995; pp. 6465–6474.

Report of Research & Development; Fine Chemical; vol. 23, No. 9, 1994; pp. 5–15.

* cited by examiner

*Primary Examiner*—David J. Buttner
(74) *Attorney, Agent, or Firm*—Sughrue Mion, PLLC

(57) ABSTRACT

A golf ball is characterized by comprising a molded and vulcanized product of a rubber composition as a constituent component, the rubber composition comprising 100 pbw of a base rubber composed primarily of a polybutadiene containing at least 60 wt % of cis-1,4-bond, having a Mooney viscosity ($ML_{1+4}$, 100° C.) of at least 30, and synthesized using a rare-earth catalyst, 15–50 pbw of an unsaturated carboxylic acid and/or a metal salt thereof, at least 2 pbw of a processing aid having a highest melting point of up to 115° C., and at least two organic peroxides including an organic peroxide having the shortest half-life at 155° C. designated (a) and another organic peroxide having the longest half-life at 155° C. designated (b), a ratio of half-lives ($b_t/a_t$) being at least 7 wherein $a_t$ is the half-life of (a) and $b_t$ is the half-life of (b), a total content of the organic peroxides being 0.1–0.9 pbw per 100 pbw of the base rubber.

14 Claims, No Drawings

GOLF BALL

BACKGROUND OF THE INVENTION

This invention relates to a golf ball which can be manufactured with ease of working and exhibits good resilience characteristics.

To confer golf balls with outstanding resilience characteristics, various improvements were made in the prior art in formulating the polybutadiene used as the base rubber.

For example, U.S. Pat. No. 4,683,257 proposes a rubber composition for use in solid golf balls, comprising a polybutadiene having a Mooney viscosity of 70 to 100 and synthesized using a nickel or cobalt catalyst, in admixture with another polybutadiene having a Mooney viscosity of 30 to 90 and synthesized using a lanthanoid catalyst or polybutadiene having a Mooney viscosity of 20 to 50 and synthesized using a nickel or cobalt catalyst as the base rubber.

However, the composition of the above patent needs further improvements in workability during extrusion and resilience.

U.S. Pat. No. 4,955,613 proposes golf balls prepared using a blend of a polybutadiene having a Mooney viscosity of less than 50 and synthesized with a Group VIII catalyst in combination with a polybutadiene having a Mooney viscosity of less than 50 and synthesized with a lanthanide catalyst. However, the resulting golf balls have poor resilience characteristics.

U.S. Pat. No. 6,312,346 proposes a multi-piece solid golf ball having an intermediate layer formed of a low-Mooney viscosity polybutadiene; JP-A 11-319148 proposes a solid golf ball molded from a rubber composition comprising a polybutadiene having a Mooney viscosity of 50 to 69 and synthesized using a nickel or cobalt catalyst in combination with a polybutadiene having a Mooney viscosity of 20 to 90 and synthesized using a lanthanoid catalyst; U.S. Pat. No. 6,194,505 proposes a solid golf ball molded from a rubber composition based on a rubber having a 1,2 vinyl content of at most 2.0% and a weight-average molecular weight to number-average molecular weight ratio Mw/Mn of not more than 3.5; U.S. Pat. No. 4,929,678 proposes a golf ball molded from a rubber composition comprising a high Mooney viscosity polybutadiene; and U.S. Pat. No. 5,082,285 proposes a golf ball molded from a rubber composition comprising polybutadiene having a high number-average molecular weight in admixture with polybutadiene having a low number-average molecular weight. However, all these proposals have drawbacks including difficult working during extrusion and inferior resilience characteristics of the resulting golf balls.

U.S. Pat. No. 4,546,980 describes use of two organic peroxides, and U.S. Pat. No. 4,770,422 describes use of amino amount of organic peroxide. However, there arise problems including insufficient resilience and a prolonged crosslinking time causing a substantial lowering of productivity.

In general, polybutadienes synthesized using rare-earth catalysts are believed to be highly resilient, but leave a problem of extremely inefficient working.

In the prior art, studies for achieving effective working are being made by varying the blend ratio of different polybutadienes while there remains a problem that a polybutadiene having ease of working is added at the sacrifice of resilience.

For conventional polybutadienes synthesized using Group VIII catalysts, there remains a problem that if the amount of organic peroxide added thereto is reduced, a longer vulcanization time is needed, resulting in a lowering of productivity.

SUMMARY OF THE INVENTION

An object of the invention is to provide a golf ball which can be manufactured with ease of working due to improved extrudability, is improved in productivity due to reduced vulcanization time, and exhibits good resilience characteristics.

Making extensive investigations to achieve the above object, the inventor has found that when a rubber composition is formulated by using a base rubber composed primarily of a polybutadiene containing at least 60% by weight of cis-1,4-bond, having a Mooney viscosity ($ML_{1+4}$ (100° C.)) of at least 30, and synthesized using a rare-earth catalyst, compounding 100 parts by weight of the base rubber with 15 to 50 parts by weight of an unsaturated carboxylic acid and/or a metal salt thereof, and at least 2 parts by weight of a processing aid having a highest melting point of up to 115° C., and further compounding therewith at least two organic peroxides including an organic peroxide having the shortest half-life at 155° C. designated (a) and another organic peroxide having the longest half-life at 155° C. designated (b), a ratio of half-lives ($b_t/a_t$) being at least 7 wherein $a_t$ is the half-life of (a) and $b_t$ is the half-life of (b), in a total content of 0.1 to 0.9 part by weight per 100 parts by weight of the base rubber, a golf ball comprising a molded and vulcanized product of the rubber composition as a constituent component, especially a solid golf ball comprising a molded and vulcanized product of the rubber composition as the solid core is improved in manufacture efficiency and resilience characteristics. Specifically, by using a highly resilient polybutadiene synthesized with a rare-earth catalyst, and compounding at least 2 parts by weight of a metal salt of fatty acid having a highest melting point of up to 115° C. and 0.1 to 0.9 part by weight of at least two organic peroxides having largely different half-lives, there are accomplished advantages including easier working, a reduced vulcanization time, improved productivity and further improved resilience.

Accordingly, the present invention provides a golf ball as set forth below.

[1] A golf ball characterized by comprising a molded and vulcanized product of a rubber composition as a constituent component, the rubber composition comprising 100 parts by weight of a base rubber composed primarily of a polybutadiene containing at least 60% by weight of cis-1,4-bond, having a Mooney viscosity ($ML_{1+4}$ (100° C.)) of at least 30, and synthesized using a rare-earth catalyst, 15 to 50 parts by weight of an unsaturated carboxylic acid and/or a metal salt thereof, at least 2 parts by weight of a processing aid having a highest melting point of up to 115° C., and at least two organic peroxides including an organic peroxide having the shortest half-life at 155° C. designated (a) and another organic peroxide having the longest half-life at 155° C. designated (b), a ratio of half-lives ($b_t/a_t$) being at least 7 wherein $a_t$ is the half-life of (a) and $b_t$ is the half-life of (b), a total content of the organic peroxides being 0.1 to 0.9 part by weight per 100 parts by weight of the base rubber.

[2] The golf ball of [1] wherein the processing aid comprises a metal salt of higher fatty acid.

[3] The golf ball of [2] wherein the metal salt of higher fatty acid has at least 12 carbon atoms.

[4] The golf ball of [2] or [3] wherein the metal salt of higher fatty acid primarily comprises a metal salt of saturated fatty acid.

[5] The golf ball of [2] or [3] wherein the metal salt of higher fatty acid primarily comprises a metal salt of unsaturated fatty acid.

[6] The golf ball of any one of [2] to [5] wherein the metal salt of higher fatty acid primarily comprises a zinc salt of higher fatty acid.

[7] The golf ball of [1] wherein the processing aid comprises a metal complex.

[8] The golf ball of [7] wherein the metal complex is a phthalocyanine metal complex.

[9] The golf ball of [1] wherein the processing aid comprises an organosulfur compound.

[10] The golf ball of [9] wherein the organosulfur compound is 2,2'-dibenzamide-diphenyl disulfide.

[11] The golf ball of [1] wherein the processing aid comprises an aliphatic hydrocarbon.

[12] The golf ball of [1] wherein the processing aid comprises a fatty acid ester.

[13] The golf ball of [12] wherein the fatty acid ester is a higher fatty acid ester.

[14] The golf ball of [13] wherein the higher fatty acid ester has at least 12 carbon atoms.

[15] The golf ball of [1] wherein the processing aid comprises an aliphatic alcohol.

[16] The golf ball of [15] wherein the aliphatic alcohol is a higher aliphatic alcohol.

[17] The golf ball of [16] wherein the higher aliphatic alcohol has at least 12 carbon atoms.

[18] The golf ball of any one of [1] to [17] wherein the processing aid is compounded in an amount of 2 to 30 parts by weight per 100 parts by weight of the base rubber.

[19] The golf ball of [1] wherein the organosulfur compound is compounded in an amount of 0.2 to 5 parts by weight per 100 parts by weight of the base rubber.

[20] The golf ball of any one of [1] to [19] wherein the base rubber contains at least 50% by weight of the polybutadiene synthesized using a rare-earth catalyst.

[21] The golf ball of any one of [1] to [20] wherein the polybutadiene has a polydispersity index Mw/Mn of 2.0 to 8.0 wherein Mw is a weight average molecular weight and Mn is a number average molecular weight.

[22] A solid golf ball comprising a solid core which is formed using the rubber composition of any one of [1] to [21] to provide a deflection of 2.0 to 6.0 mm under an applied load of 100 kg.

DETAILED DESCRIPTION OF THE INVENTION

The golf ball of the invention comprises a molded and vulcanized product of a rubber composition as a constituent component, the rubber composition comprising (A) a base rubber composed primarily of a polybutadiene containing at least 60% by weight of cis-1,4-bond, having a Mooney viscosity ($ML_{1+4}$ (100° C.)) of at least 30, and synthesized using a rare-earth catalyst, (B) an unsaturated carboxylic acid and/or a metal salt thereof, (C) a processing aid having a highest melting point of up to 115° C., (D) organic peroxides, and optionally, (E) an organosulfur compound.

The polybutadiene serving as component (A) should contain at least 60% by weight, preferably at least 80% by weight, more preferably at least 90% by weight, most preferably at least 95% by weight of cis-1,4-bond. Too less a cis-1,4-bond content leads to a lowering of resilience or restitution.

The polybutadiene should have a Mooney viscosity ($ML_{1+4}$ (100° C.)) of at least 30, preferably at least 38, more preferably at least 45, most preferably at least 55, especially at least 65, and the upper limit of Mooney viscosity is preferably up to 140, more preferably up to 120, most preferably up to 100.

The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement is carried out at a temperature of 100° C.

It is requisite for the polybutadiene used herein to be synthesized with a rare-earth catalyst. Any well-known rare-earth catalyst may be used.

Examples of suitable catalysts include lanthanoid series rare-earth compounds, organoaluminum compounds, alumoxane, and halogen-bearing compounds, optionally in combination with Lewis bases.

Examples of suitable lanthanoid series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently hydrogen or a hydrocarbon residue of 1 to 8 carbon atoms).

Preferred alumoxanes include compounds of the structures shown in formulas (I) and (II) below. The alumoxane association complexes described in *Fine Chemical,* 23, No. 9, 5 (1994), *J. Am. Chem. Soc.,* 115, 4971 (1993), and *J. Am. Chem. Soc.,* 117, 6465 (1995) are also acceptable.

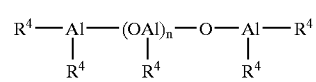

(I)

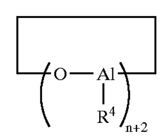

(II)

In the above formulas, $R^4$ is a hydrocarbon group having 1 to 20 carbon atoms, and n is an integer of at least 2.

Examples of halogen-bearing compounds that may be used include aluminum halides of the formula $AlX_nR_{3-n}$ (wherein X is a halogen; R is a hydrocarbon residue of 1 to 20 carbon atoms, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and other metal halides such as silicon tetrachloride, tin tetrachloride and titanium tetrachloride.

The Lewis base may be used to form a complex with the lanthanoid series rare-earth compound. Illustrative examples include acetylacetone and ketone alcohols.

In the practice of the invention, the use of a neodymium catalyst comprising a neodymium compound as the lanthanoid series rare-earth compound is advantageous because a polybutadiene rubber having a high cis-1,4 content and a low 1,2-vinyl content can be obtained at an excellent polymerization activity. Preferred examples of such rare-earth catalysts include those mentioned in JP-A 11-35633.

The polymerization of butadiene in the presence of a rare-earth catalyst may be carried out either with or without the use of solvent, as by bulk polymerization or vapor phase polymerization. The polymerization temperature is generally in a range of −30° C. to 150° C., and preferably 10° C. to 100° C.

It is also possible for the polybutadiene as component (A) to be obtained by polymerization with the above-described rare-earth catalyst, followed by the reaction of an end group modifier with active end groups on the polymer.

Any known end group modifier may be used. Examples include compounds of types (1) to (6) described below:

(1) halogenated organometallic compounds, halogenated metallic compounds and organometallic compounds of the general formulas: $R^5{}_nM'X_{4-n}$, $M'X_4$, $M'X_3$, $R^5{}_nM'(—R^6—COOR^7)_{4-n}$ or $R^5{}_nM'(—R^6—COR^7)_{4-n}$ (wherein $R^5$ and $R^6$ are each independently a hydrocarbon group of 1 to 20 carbon atoms; $R^7$ is a hydrocarbon group of 1 to 20 carbon atoms which may contain a carbonyl or ester moiety on a side chain; M' is a tin atom, silicon atom, germanium atom or phosphorus atom; X is a halogen atom; and n is an integer from 0 to 3);

(2) heterocumulene compounds containing on the molecule a Y═C═Z linkage (wherein Y is a carbon atom, oxygen atom, nitrogen atom or sulfur atom; and Z is an oxygen atom, nitrogen atom or sulfur atom);

(3) three-membered heterocyclic compounds containing on the molecule the following linkage:

(wherein Y is an oxygen atom, nitrogen atom or sulfur atom);

(4) halogenated isocyano compounds;

(5) carboxylic acids, acid halides, ester compounds, carbonate compounds or acid anhydrides of the formulas: $R^8—(COOH)_m$, $R^9(COX)_m$, $R^{10}—(COO—R^{11})_m$, $R^{12}—OCOO—R^{13}$, $R^{14}—(COOCO—R^{15})_m$ or the following formula:

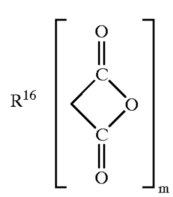

(wherein $R^8$ to $R^{16}$ are each independently a hydrocarbon group of 1 to 50 carbon atoms; X is a halogen atom; and m is an integer from 1 to 5); and (6) carboxylic acid metal salts of the formula: $R^{17}{}_lM''(OCOR^{18})_{4-l}$, $R^{19}{}_lM''(OCO—R^{20}—COOR^{21})_{4-l}$ or the following formula:

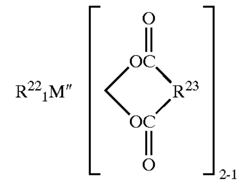

(wherein $R^{17}$ to $R^{23}$ are each independently a hydrocarbon group of 1 to 20 carbon atoms, M" is a tin atom, silicon atom or germanium atom; and l is an integer from 0 to 3).

Illustrative examples of the end group modifiers of types (1) to (6) above and methods for their reaction are described in, for instance, JP-A 11-35633 and JP-A 7-268132.

In the practice of the invention, the above-mentioned polybutadiene should preferably have a polydispersity index Mw/Mn (wherein Mw is a weight average molecular weight and Mn is a number average molecular weight) of at least 2.0, more preferably at least 2.2, even more preferably at least 2.4, most preferably at least 2.6, but up to 8.0, more preferably up to 7.5, even more preferably up to 4.0, most preferably up to 3.4. Too low Mw/Mn may lead to low working efficiency whereas too high Mw/Mn may lead to low resilience.

The invention uses a base rubber composed primarily of the above-mentioned polybutadiene. Specifically, the polybutadiene may be included in an amount of at least 50% by weight, preferably at least 60% by weight, more preferably at least 70% by weight, based on the base rubber. It is acceptable that 100% by weight of the base rubber is the above-mentioned polybutadiene while the polybutadiene content may be up to 95% by weight, and in some cases, up to 90% by weight.

Suitable rubber components other than the above-mentioned polybutadiene include polybutadienes other than the above-mentioned polybutadiene, such as polybutadiene synthesized with a Group VIII metal compound catalyst, and other diene rubbers, such as styrene-butadiene rubber, natural rubber, isoprene rubber, and ethylene-propylene-diene rubber. Preferred is a polybutadiene synthesized with a Group VIII catalyst and having a Mooney viscosity ($ML_{1+4}$ (100° C.)) of less than 50, and especially a polybutadiene synthesized with a nickel catalyst and having a Mooney viscosity ($ML_{1+4}$ (100° C.)) of less than 50.

Next referring to component (B), suitable unsaturated carboxylic acids include acrylic acid, methacrylic acid, maleic acid and fumaric acid. Acrylic acid and methacrylic acid are especially preferred. Suitable unsaturated carboxylic acid metal salts include the zinc and magnesium salts of unsaturated fatty acids. Zinc acrylate is especially preferred.

The unsaturated carboxylic acid and/or salt thereof serving as component (B) is preferably included in an amount, per 100 parts by weight of the base rubber as component (A), of at least 15 parts by weight, more preferably at least 18 parts by weight, even more preferably at least 21 parts by weight, and most preferably at least 24 parts by weight, but not more than 50 parts by weight, more preferably not more than 45 parts by weight, even more preferably not more than 40 parts by weight, and most preferably not more than 37 parts by weight.

Component (C) compounded in the inventive composition is processing aids having the highest melting point of up to 115° C., preferably up to 110° C., more preferably up to 108° C., even more preferably up to 105° C. The lower limit of melting point is preferably at least 60° C., more preferably at least 70° C., even more preferably at least 80° C., most preferably at least 90° C.

Suitable processing aids include
(i) higher fatty acid metal salts,
(ii) metal complexes,
(iii) organosulfur compounds,
(iv) aliphatic hydrocarbons,
(v) fatty acid esters, and
(vi) aliphatic alcohols,
which may be used alone or in combination of two or more.

The processing aids contain the higher fatty acid metal salts (i) as a main component, for example, Aktiplast GT, which has a melting range of 99 to 107° C., Aktiplast PP, which has a melting range of 98 to 104° C., Aktiplast F, which has a melting range of 75 to 87° C., Aktiplast MS, which has a melting range of 94 to 110° C., Aktiplast M, Aktiplast T, Aktiplast 8, Aktiplast ST, Aflux 12 and Aflux 42, all available from Rhein Chemie, with Aktiplast GT and Aktiplast PP being preferred.

The higher fatty acid metal salts are represented by RCOOM, and higher fatty acids wherein the number of carbon atoms in R is at least 11, more preferably at least 13, even more preferably at least 15, but up to 31, more preferably up to 27, even more preferably up to 24 are preferred. Suitable higher fatty acids include oleic acid, rape oil fatty acids, tall oil fatty acids, stearic acid, lauric acid, linoleic acid, abietic acid, erucic acid, myristic acid, arachic acid, and lignoceric acid, alone or in admixture thereof. The fatty acids may be either saturated fatty acids or unsaturated fatty acid, although the inclusion of saturated fatty acids as a main component is preferred. M stands for an alkaline earth or alkali metal, and any such metal may be used as long as the specific melting point is obtainable. Illustrative examples include Na, K, Li, Ba, Ca, Mg, Al, Fe and Zn, with the Zn salts being preferred.

The metal complexes (ii) are phthalocyanine metal complexes. Examples include tetraazaporphin or hemiporphyrazine metal complexes, specifically those described in U.S. Pat. No. 3,839,250, col. 4, line 37 to col. 5, line 3.

The organosulfur compounds (iii) which may be used herein include, for example, 2,2'-dibenzamide-diphenyl disulfide (DBD), etc. The organosulfur compounds (iii) are previously added to the processing aids, especially the higher fatty acid metal salt, as one processing aid component.

The aliphatic hydrocarbons (iv) are preferably those in which the number of carbon atoms is at least 11, more preferably at least 13, even more preferably at least 15 and up to 31, more preferably up to 27, even more preferably up to 24.

The fatty acid esters (v) are represented by RCOOR', with higher fatty acid esters being preferred. It is preferred that the number of carbon atoms in R be at least 11, more preferably at least 13, even more preferably at least 15 and up to 31, more preferably up to 27, even more preferably up to 24; and the number of carbon atoms in R' be at least 11, more preferably at least 13, even more preferably at least 15 and up to 31, more preferably up to 27, even more preferably up to 24.

The aliphatic alcohols (vi) are preferably higher aliphatic alcohols. Especially preferred are those higher aliphatic alcohols in which the number of carbon atoms is at least 11, more preferably at least 13, even more preferably at least 15 and up to 31, more preferably up to 27, even more preferably up to 24.

An amount of component (C) used per 100 parts by weight of component (A) is at least 2 parts by weight, preferably at least 6 parts by weight, more preferably at least 8 parts by weight, even more preferably at least 10 parts by weight, most preferably at least 12 parts by weight, and preferably up to 30 parts by weight, more preferably up to 27 parts by weight, even more preferably up to 24 parts by weight, further preferably up to 20 parts by weight, most preferably up to 15 parts by weight.

Two or more organic peroxides are used as component (D). Provided that an organic peroxide having the shortest half-life at 155° C. is designated (a), another organic peroxide (b) having the longest half-life at 155° C. is designated (b), the half-life of (a) is designated at, and the half-life of (b) is designated $b_t$, the ratio of half-lives ($b_t/a_t$) should be at least 7, preferably at least 8, more preferably at least 9, even more preferably at least 10, and preferably up to 20, more preferably up to 18, even more preferably up to 16, most preferably up to 14. Even when two or more organic peroxides are used, a half-life ratio outside the range may lead to poor resilience, compression and durability.

Herein, the half-life ($a_t$) at 155° C. of the peroxide (a) is preferably at least 5 seconds, more preferably at least 10 seconds, even more preferably at least 15 seconds, and up to 120 seconds, more preferably up to 90 seconds, even more preferably up to 60 seconds. The half-life ($b_t$) at 155° C. of the peroxide (b) is preferably at least 300 seconds, more preferably at least 360 seconds, even more preferably at least 420 seconds, and preferably up to 800 seconds, more preferably up to 700 seconds, even more preferably up to 600 seconds.

The total content of the organic peroxides including (a) and (b) is at least 0.1 part, preferably at least 0.2 part, more preferably at least 0.3 part, even more preferably at least 0.4 part by weight and up to 0.9 part, preferably up to 0.8 part, more preferably up to 0.7 part, even more preferably up to 0.6 part by weight, per 100 parts by weight of component (A). Too low an organic peroxide content leads to an extended time required for crosslinking, a substantial lowering of productivity, and a substantial lowering of compression. With too high a content, resilience and durability decline.

The amount of peroxide (a) added per 100 parts by weight of component (A) is preferably at least 0.05 part, more preferably at least 0.08 part, even more preferably at least 0.1 part by weight, but preferably up to 0.5 part, more preferably up to 0.4 part, even more preferably up to 0.3 part by weight. The amount of peroxide (b) added per 100 parts by weight of component (A) is preferably at least 0.05 part, more preferably at least 0.15 part, even more preferably at least 0.2 part by weight, but preferably up to 0.7 part, more preferably up to 0.6 part, even more preferably up to 0.5 part by weight.

Illustrative examples of the organic peroxides include dicumyl peroxide, 1,1-bis(t-butylperoxy)-3,3,5-trimethylcyclohexane, and α,α'-bis(t-butylperoxy) diisopropylbenzene. The organic peroxides used may be commercial products, suitable examples of which include Percumyl D (manufactured by NOF Corporation), Perhexa 3M (manufactured by NOF Corporation) and Luperco 231XL (manufactured by Atochem Co.). Herein, the preferred organic peroxide (a) is 1,1-bis(t-butylperoxy)-3,3,5-trimethylcyclohexane, and the preferred organic peroxide (b) is dicumyl peroxide.

The organosulfur compound serving as component (E) includes, for example, thiophenols, thionaphthols, halogenated thiophenols, and metal salts thereof. Specific examples include pentachlorothiophenol, pentafluorothiophenol, pentabromothiophenol, p-chlorothiophenol, and zinc salts thereof; and organosulfur compounds having 2 to 4 sulfur atoms, such as diphenyl polysulfides, dibenzyl polysulfides, dibenzoyl polysulfides, dibenzothiazoyl polysulfides, dithiobenzoyl polysulfides, alkylphenyl disulfides, sulfur compounds having a furan ring, and sulfur compounds having a thiophene ring. The zinc salt of pentachlorothiophenol and diphenyl disulfide are especially preferred. It is preferred that the organosulfur compound be included in an amount, per 100 parts by weight of the base rubber, of at least 0.2 part, more preferably at least 0.3 part, even more preferably at least 0.5 part, and most preferably at least 0.7 part by weight, but not more than 5 parts, more preferably not more than 4 parts, even more preferably not more than 3 parts, and most preferably not more than 2 parts by weight.

In the rubber composition according to the invention, an inorganic filler is preferably compounded. Exemplary inorganic fillers include zinc oxide, barium sulfate and calcium carbonate. It is preferred that the inorganic filler be included in an amount, per 100 parts by weight of component (A), of at least 1 part, more preferably at least 3 parts, even more preferably at least 5 parts, and most preferably at least 7 parts by weight, but not more than 130 parts, more preferably not more than 50 parts, even more preferably not more than 45 parts, and most preferably not more than 40 parts by weight.

If necessary, an antioxidant may be included in an amount of at least 0.05 part, more preferably at least 0.1 part, even more preferably at least 0.2 part by weight, but not more than 3 parts, more preferably not more than 2 parts, even more preferably not more than 1 part, and most preferably not more than 0.5 part by weight, per 100 parts by weight of component (A). The antioxidants used may be commercial products, for example, Nocrack NS-6 and NS-30 (Ouchi Shinko Chemical Industry Co., Ltd.), and Yoshinox 425 (Yoshitomi Pharmaceutical Industries, Ltd.).

The molded and vulcanized product according to the invention is obtainable by vulcanizing or curing the above-described rubber composition in a similar manner as are well-known golf ball-forming rubber compositions. Vulcanization may be carried out under suitable conditions, for example, a vulcanization temperature of 100 to 200° C. and a vulcanization time of 10 to 40 minutes.

In the invention, the hardness of the molded/vulcanized product can be adjusted as appropriate in accordance with any serviceable one of various golf ball constructions to be described later, and is not particularly limited. The cross-sectional hardness may either be flat from the center to the surface of the molded product or have a difference between the center and the surface of the molded product.

The golf ball of the invention may take any of various golf ball constructions to be described later. Particularly when the golf ball is a one-piece golf ball or a golf ball having a solid core or solid center, it is recommended that the one-piece solid golf ball, solid core or solid center generally have a deflection under an applied load of 980 N (100 kg) of at least 2.0 mm, preferably at least 2.5 mm, more preferably at least 2.8 mm, most preferably at least 3.2 mm, but up to 6.0 mm, preferably up to 5.5 mm, more preferably up to 5.0 mm, most preferably up to 4.5 mm. Too small a deformation may lead to a poor feel and in particular, too much spin on long shots with a driver or similar club designed to induce large deformation to the ball, failing to travel a distance. If too soft, probable results are a dull feel, insufficient resilience, a failure to travel a distance, and poor crack durability upon repetitive impacts.

As long as the golf ball of the invention includes the above molded/vulcanized product as a constituent component, the construction of the ball is not critical. Examples of suitable golf ball constructions include one-piece golf balls in which the molded/vulcanized product itself is used directly as the golf ball, two-piece solid golf balls wherein the molded/vulcanized product serves as a solid core on the surface of which a cover is formed, multi-piece solid golf balls made of three or more pieces in which the molded/vulcanized product serves as a solid core over which a cover composed of two or more layers is formed, and thread-wound golf balls in which the molded/vulcanized product serves as the center core. From the standpoints of taking advantage of the characteristics of the molded/vulcanized product, enabling extrusion during manufacture, and imparting resilience characteristics to golf ball products, the two-piece solid golf balls and multi-piece solid golf balls in which the molded/vulcanized product is used as the solid core are recommended as the preferred construction.

In one embodiment of the invention wherein the molded/vulcanized product is used as a solid core in the manner described above, it is recommended that the solid core have a diameter of at least 30.0 mm, preferably at least 32.0 mm, more preferably at least 35.0 mm, and most preferably at least 37.0 mm, but not more than 41.0 mm, preferably not more than 40.5 mm, even more preferably not more than 40.0 mm, and most preferably not more than 39.5 mm. In particular, it is desirable for a two-piece solid golf ball to have a diameter of at least 37.0 mm, preferably at least 37.5 mm, even more preferably at least 38.0 mm, and most preferably at least 38.5 mm, but not more than 41.0 mm, preferably not more than 40.5 mm, and most preferably not more than 40.0 mm. Similarly, it is desirable for a three-piece solid golf ball to have a diameter of at least 30.0 mm, preferably at least 32.0 mm, more preferably at least 34.0 mm, and most preferably at least 35.0 mm, but not more than 40.0 mm, preferably not more than 39.5 mm, and most preferably not more than 39.0 mm.

It is also recommended that the solid core have a specific gravity of at least 0.9, preferably at least 1.0, and most preferably at least 1.1, but not more than 1.4, preferably not more than 1.3, and most preferably not more than 1.2.

When the golf ball of the invention is a two-piece solid golf ball or a multi-piece solid golf ball, it can be manufactured by using the molded/vulcanized product as the solid core, and injection molding or compression molding known intermediate layer and cover materials therearound.

These intermediate layer and cover materials may be mainly composed of, for example, a thermoplastic or thermosetting polyurethane elastomer, polyester elastomer, ionomer resin, polyolefin elastomer or mixture thereof. Any one or mixture of two or more thereof may be used, although the use of a thermoplastic polyurethane elastomer or ionomer resin is especially preferred.

Illustrative examples of thermoplastic polyurethane elastomers that may be used include commercial products in which the diisocyanate is an aliphatic or aromatic compound, such as Pandex T7298, T7295, T7890, TR3080 and T8295 (manufactured by DIC Bayer Polymer Ltd.). Illustrative examples of suitable commercial ionomer resins include Surlyn 6320 and 8120 (manufactured by E.I. du Pont de Nemours and Co., Inc.), and Himilan 1706, 1605, 1855, 1601 and 1557 (manufactured by DuPont-Mitsui Polychemicals Co., Ltd.).

Together with the main ingredient described above, the intermediate layer or cover material may include also, as an optional ingredient, polymers (e.g., thermoplastic elastomers) other than the foregoing. Specific examples of polymers that may be included as optional ingredients include polyamide elastomers, styrene block elastomers, hydrogenated polybutadienes and ethylene-vinyl acetate (EVA) copolymers.

In one embodiment (A) of the multi-piece solid golf balls comprising a solid core and a cover of two or more layers, it is recommended that the solid core formed of the above rubber composition have a deflection of at least 2.5 mm, especially at least 3.0 mm, but up to 6.0 mm, especially up to 5.5 mm under an applied load of 100 kg; the cover innermost layer have a Shore D hardness of at least 50, especially at least 55, but up to 70, especially up to 65; the cover outermost layer have a Shore D hardness of at least 40, especially at least 43, but up to 55, especially up to 50; and the cover innermost layer be made harder than the cover outermost layer, whereby golf balls having excellent resilience characteristics and improved controllability are obtainable.

In this embodiment, it is further preferred that the core have a diameter of at least 30 mm, especially at least 34 mm, but up to 40 mm, especially up to 39 mm; the cover innermost layer have a gage of at least 0.5 mm, especially at least 1.0 mm, but up to 3.0 mm, especially up to 2.0 mm; the cover outermost layer have a gage of at least 0.5 mm, especially at least 1.0 mm, but up to 2.5 mm, especially up to 2.0 mm; and the cover have a total gage of at least 1.0 mm, especially at least 1.5 mm, but up to 5.5 mm, especially up to 4.5 mm.

In an alternative embodiment (B) of the multi-piece solid golf balls comprising a solid core and a cover of two or more layers, it is recommended that the solid core formed of the above rubber composition have a deflection of at least 3.0 mm, especially at least 3.5 mm, but up to 6.0 mm, especially up to 5.5 mm under an applied load of 100 kg; the cover innermost layer have a Shore D hardness of at least 8, especially at least 30, but up to 49, especially up to 45; the cover outermost layer have a Shore D hardness of at least 56, especially at least 59, but up to 70, especially up to 65; and the cover outermost layer be made harder than the cover innermost layer, whereby golf balls having a good feel when hit and improved flight performance are obtainable.

In this embodiment, it is further preferred that the core have a diameter of at least 30 mm, especially at least 34 mm, but up to 40 mm, especially up to 39 mm; the cover innermost layer have a gage of at least 0.5 mm, especially at least 1.0 mm, but up to 5.0 mm, especially up to 2.5 mm; the cover outermost layer have a gage of at least 1.0 mm, especially at least 1.3 mm, but up to 3.0 mm, especially up to 2.2 mm; and the cover have a total gage of at least 1.5 mm, especially at least 2.5 mm, but up to 8.0 mm, especially up to 6.0 mm.

In the case of two-piece solid golf balls, it is recommended that the core formed of the above rubber composition have a deflection of at least 2.0 mm, especially at least 2.8 mm, but up to 5.0 mm, especially up to 4.5 mm under an applied load of 100 kg; and the cover have a Shore D hardness of at least 30, especially at least 40, but up to 65, especially up to 62, whereby golf balls having superior flight distance and a soft feel are obtainable.

In this embodiment, it is further preferred that the core have a diameter of 37 to 41 mm, especially 39.5 to 40.5 mm.

The golf ball of the invention can be manufactured for competitive use so as to meet the Rules of Golf, that is, to a diameter of at least 42.67 mm and a weight of not more than 45.93 g. It is recommended that the upper limit of diameter be no more than 44.0 mm, preferably no more than 43.5 mm, and most preferably no more than 43.0 mm; and that the lower limit of weight be at least 44.5 g, preferably at least 45.0 g, more preferably at least 45.1 g, and most preferably at least 45.2 g.

The golf balls of the invention can be efficiently manufactured within a short vulcanization time and at a high productivity and have excellent resilience characteristics.

EXAMPLE

Examples and comparative examples are given below to illustrate the invention, and are not intended to limit the scope thereof.

Examples & Comparative Examples

Cores of two-piece golf balls were manufactured using rubber compositions shown in Tables 1 to 3. The cores had an outer diameter of 38.9 mm and a weight of 36.0 g. A cover material which was a mixture of Himilan 1601 and Himilan 1557 in a weight ratio of 1:1 was injected around the cores, forming dimpled golf balls. Their surface was coated with paint, yielding two-piece solid golf balls having an outer diameter of 42.7 mm and a weight of 45.3 g.

By the following test methods, the cores were examined for deflection under a load of 100 kg, initial velocity, and extrusion efficiency, and the golf balls evaluated for flight performance. The results are shown in Tables 1 to 3.

Deflection Under 100 kg Loading

Measured as the deformation (mm) of the solid core under an applied load of 100 kg (980 N).

Initial Velocity

The initial velocity of the core was measured with the same type of initial velocity instrument as used by the official association USGA. The initial velocity of Examples 1–11 and Comparative Examples 2–6 is reported as a difference from that of Comparative Example 1.

Extrusion Efficiency

By observing the appearance of a slug as extruded, extrusion efficiency was evaluated according to the following criterion.

| | |
|---|---|
| 5: | slug skin is clean and very good |
| 4: | slug skin is slightly rugged, but good |
| 3: | fluffy slug skin, extrudable |
| 2: | noticeably fluffy slug skin, extrudable |
| 1: | defective slug skin, difficult extrusion of a certain amount |

Flight Performance

The flight performance of the golf ball was determined by using a hitting machine, and hitting the ball with a driver (W#1, Tour Stage X500, loft 9°, shaft X, Bridgestone Sports Co., Ltd.) at a head speed (HS) of 45 m/s.

TABLE 1

| Components (pbw) | | Example 1 | 2 | 3 | 4 | 5 | 6 | 7 | 8 | 9 | 10 |
|---|---|---|---|---|---|---|---|---|---|---|---|
| Polybutadiene | BR18 | | | | | | | | 30 | | |
| | BR01 | | | | | | | | | 45 | |
| | CB22 | | | | | | 100 | | | | |
| | HCBN-13 | 100 | 100 | 100 | 100 | 100 | | | 70 | 55 | 100 |
| | SR8510 | | | | | | | 100 | | | |
| Organic peroxide | (a) Perhexa 3M-40[1)] | 0.15 | 0.3 | 0.3 | 0.3 | 0.3 | 0.3 | 0.3 | 0.4 | 0.4 | 0.3 |
| | Net amount of Perhexa 3M | 0.06 | 0.12 | 0.12 | 0.12 | 0.12 | 0.12 | 0.12 | 0.16 | 0.16 | 0.12 |
| | (b) Percumyl D | 0.3 | 0.3 | 0.3 | 0.3 | 0.5 | 0.3 | 0.3 | 0.4 | 0.4 | 0.3 |
| Zinc oxide | | 22.3 | 22.8 | 23.4 | 24.4 | 24.8 | 23.4 | 23.4 | 23.4 | 23.4 | 23.4 |
| Antioxidant | | 0.1 | 0.1 | 0.1 | 0.1 | 0.1 | 0.1 | 0.1 | 0.1 | 0.1 | 0.1 |
| Zinc acrylate | | 24 | 24.5 | 25.5 | 26 | 27.5 | 25.5 | 25.5 | 25.5 | 25.5 | 25.5 |
| Organosulfur compound | Zn salt of pentachlorothio phenol | | | | | | | | | | |
| Zinc stearate | | | | | | | | | | | |
| Processing aids | Aktiplast GT | 2 | 5 | 10 | 15 | 20 | 10 | 10 | | | |
| | Aktiplast MS | | | | | | | | 10 | | |
| | Aktiplast PP | | | | | | | | | 10 | |
| | Aktiplast F | | | | | | | | | | 10 |
| Organic peroxide | Half-life ratio ($b_t/a_t$) | 12 | 12 | 12 | 12 | 12 | 12 | 12 | 12 | 12 | 12 |
| | Net amount | 0.36 | 0.42 | 0.42 | 0.42 | 0.62 | 0.42 | 0.42 | 0.56 | 0.56 | 0.42 |
| Core | Deflection (mm) under 100 kg load | 3.8 | 3.8 | 3.8 | 3.8 | 3.8 | 3.8 | 3.8 | 4.0 | 4.0 | 4.0 |
| | Initial velocity (m/s) | +0.5 | +0.5 | +0.6 | +0.6 | +0.5 | +0.7 | +0.7 | +0.5 | +0.4 | +0.6 |
| | Extrusion efficiency | 3 | 4 | 5 | 5 | 5 | 5 | 5 | 5 | 5 | 5 |
| Ball flight performance W#1/HS45 | Carry (m) | 220.0 | 220.1 | 221.1 | 221.0 | 220.0 | 222.1 | 222.2 | 219.9 | 218.9 | 221.0 |
| | Total (m) | 234.0 | 234.2 | 235.1 | 235.0 | 234.1 | 234.2 | 234.1 | 234.2 | 233.0 | 235.0 |

[1)]40% dilution of organic peroxide

TABLE 2

| Components (pbw) | | Comparative Example 1 | 2 | 3 | 4 | 5 | 6 | 7 |
|---|---|---|---|---|---|---|---|---|
| Polybutadiene | BR18 | 100 | | | 100 | 100 | | 100 |
| | BR01 | | 100 | | | | | |
| | CB22 | | | | | | | |
| | HCBN-13 | | | 100 | | | 100 | |
| | SR8510 | | | | | | | |
| Organic peroxide | (a) Perhexa 3M-40[1)] | 0.6 | 0.6 | 0.6 | 0.6 | 0.6 | 0.6 | 0 |
| | Net amount of Perhexa 3M | 0.24 | 0.24 | 0.24 | 0.24 | 0.24 | 0.24 | 0 |
| | (b) Percumyl D | 0.8 | 0.6 | 0.5 | 0.8 | 0.8 | 0.8 | 1.4 |
| Zinc oxide | | 23.5 | 23.5 | 23.5 | 23.5 | 34.6 | 25.6 | 24.2 |
| Antioxidant | | 0.1 | 0.1 | 0.1 | 0.1 | 0.1 | 0.1 | 0.1 |
| Zinc acrylate | | 20 | 20 | 20 | 20 | 20 | 19 | 19 |
| Organosulfur compound | Zn salt of pentachlorothiophenol | | | | | | | |
| Zinc stearate | | | | | | | 10 | |
| Processing aids | Aktiplast GT | | | | 1 | 50 | | |
| | Aktiplast MS | | | | | | | |
| | Aktiplast PP | | | | | | | |
| | Aktiplast F | | | | | | | |
| Organic peroxide | Half-life ratio ($b_t/a_t$) | 12 | 12 | 12 | 12 | 12 | 12 | ∞ |
| | Net amount | 1.04 | 0.84 | 0.74 | 1.04 | 1.04 | 1.04 | 1.4 |
| Core | Deflection (mm) under 100 kg load | 3.8 | 3.8 | 3.8 | 3.8 | 6.0 | 3.6 | 3.8 |
| | Initial velocity (m/s) | 0 | −0.1 | +0.1 | 0 | −1.2 | 0 | −0.5 |
| | Extrusion efficiency | 4 | 5 | 1 | 4 | 5 | 1 | 5 |
| Ball flight performance W#1/HS45 | Carry (m) | 215.0 | 214.1 | 216.0 | 215.1 | 208.1 | 215.5 | 210.0 |
| | Total (m) | 229.0 | 228.0 | 230.0 | 229.1 | 219.5 | 229.2 | 223.8 |

[1)]40% dilution of organic peroxide

TABLE 3

| Components (pbw) | | Example 11 | Example 12 | Example 13 | Comparative Example 8 | Comparative Example 9 | Comparative Example 10 |
|---|---|---|---|---|---|---|---|
| Polybutadiene | BR18 | | | | 100 | | |
| | BR01 | | | 20 | | | |
| | CB22 | 100 | | | | | |
| | HCBN-13 | | 100 | | | 100 | 100 |
| | SR8510 | | | 80 | | | |
| Organic peroxide | (a) Perhexa 3M-40[1)] | 0.3 | 0.3 | 0.3 | 0.3 | 0.3 | 0 |
| | Net amount of Perhexa 3M | 0.12 | 0.12 | 0.12 | 0.12 | 0.12 | 0 |
| | (b) Percumyl D | 0.3 | 0.3 | 0.3 | 0.3 | 0.3 | 1.4 |
| Zinc oxide | | 21.4 | 20.3 | 21.4 | 20.9 | 22.7 | 21.1 |
| Antioxidant | | 0.1 | 0.1 | 0.1 | 0.1 | 0.1 | 0.1 |
| Zinc acrylate | | 29.5 | 29 | 29 | 25 | 25 | 25 |
| Organosulfur compound | Zn salt of pentachlorothiophenol | 1 | 1 | 1 | 1 | 1 | 1 |
| Zinc stearate | | | | | | 10 | |
| Processing aids | Aktiplast GT | 10 | 5 | | | | |
| | Aktiplast MS | | | | | | |
| | Aktiplast PP | | | 10 | | | |
| | Aktiplast F | | | | | | |
| Organic peroxide | Half-life ratio ($b_t/a_t$) | 12 | 12 | 12 | 12 | 12 | ∞ |
| | Net amount | 0.42 | 0.42 | 0.42 | 0.42 | 0.42 | 1.4 |
| Core | Deflection (mm) under 100 kg load | 4.0 | 4.0 | 4.0 | 4.0 | 3.8 | 4.0 |
| | Initial velocity (m/s) | +1.2 | +1.1 | +1.1 | +0.8 | +0.9 | +0.4 |
| | Extrusion efficiency | 5 | 4 | 5 | 4 | 1 | 1 |
| Ball flight performance W#1/HS45 | Carry (m) | 227.2 | 226.0 | 225.7 | 223.0 | 223.9 | 219.1 |
| | Total (m) | 241.1 | 240.0 | 239.7 | 235.0 | 235.7 | 233.0 |

1)40% dilution of organic peroxide

Polybutadiene BR18: made by JSR Corporation, cis-1,4 content 96%, Mooney viscosity ($ML_{1+4}$ (100° C.)) 60, polydispersity index Mw/Mn 4.2, Ni catalyst Polybutadiene BR01: made by JSR Corporation, cis-1,4 content 95%, Mooney viscosity ($ML_{1+4}$ (100° C.)) 44, polydispersity index Mw/Mn 4.2, Ni catalyst Polybutadiene CB22: made by Bayer AG, cis-1,4 content 98%, Mooney viscosity ($ML_{1+4}$ (100° C.)) 62, polydispersity index Mw/Mn 7.1, Nd catalyst Polybutadiene HCBN-13: made by JSR Corporation, cis-1,4 content 96%, Mooney viscosity ($ML_{1+4}$ (100° C.)) 54, polydispersity index Mw/Mn 3.2, Nd catalyst Polybutadiene SR8510: made by Firestone Polymers, cis-1,4 content 96%, Mooney viscosity ($ML_{1+4}$ (100° C.)) 45, polydispersity index Mw/Mn 2.5, Nd catalyst Perhexa 3M-40: 1,1-bis(t-butylperoxy)-3,3,5-trimethylcyclohexane, made by NOF Corporation, half-life at 155° C.=40 sec Percumyl D: dicumyl peroxide, made by NOF Corporation, half-life at 155° C.=8 min Aktiplast GT: made by Rhein Chemie, melting point ~103° C., a mixture based on saturated fatty acid zinc salts Aktiplast MS: made by Rhein Chemie, melting point ~105° C., an active mixture based on high molecular saturated fatty acid zinc salts with sulfur compound added Aktiplast PP: made by Rhein Chemie, melting point ~101° C., a mixture based on saturated fatty acid zinc salts Aktiplast F: made by Rhein Chemie, melting point ~85° C., a mixture of unsaturated fatty acid zinc salt and activator Zinc stearate: melting point ~124° C.

From the above results, the following conclusion is ascertained.

Comparative Examples 1 and 2

Because of polybutadiene synthesized with Ni catalyst and the absence of processing aids, the resilience and flight distance are reduced.

Comparative Example 3

Because of polybutadiene synthesized with Nd catalyst and the absence of processing aids, the extrusion efficiency is very low.

Comparative Example 4

Because of a small amount of processing aid added, the resilience and flight distance are reduced.

Comparative Example 5

Because of an excess of processing aid added, the deflection is too much and the resilience and flight distance are reduced.

Comparative Example 6

The addition of zinc stearate does not improve the extrusion efficiency, with the results of less deflection, increased hardness, reduced resilience and reduced flight distance.

Comparative Example 7

Because of a single organic peroxide used, the resilience is substantially reduced.

Comparative Example 8

Because of polybutadiene synthesized with Ni catalyst and the absence of processing aids, the resilience and flight distance are reduced.

Comparative Example 9

The addition of zinc stearate does not improve the extrusion efficiency, with the results of less deflection, increased hardness, reduced resilience and reduced flight distance.

Comparative Example 10

Because of a single organic peroxide used, the resilience is substantially reduced.

In contrast, the balls of Examples exhibited improved resilience and flight performance as well as satisfactory extrusion efficiency.

What is claimed is:

1. A solid golf ball comprising a solid core formed using a molded and vulcanized product of a rubber composition as a constituent component, the rubber composition comprising 100 parts by weight of a base rubber composed primarily of a polybutadiene containing at least 60% by weight of cis-1,4-bond, having a Mooney viscosity ($ML_{1+4}$ (100° C.)) of at least 30, and synthesized using a rare-earth catalyst, 15 to 50 parts by weight of an unsaturated carboxylic acid and/or a metal salt thereof, at least 2 parts by weight of a processing aid having a melting point of 60 to 115° C., and at least two organic peroxides including an organic peroxide having the shortest half-life at 155° C. designated (a) and another organic peroxide having the longest half-life at 155° C. designated (b), a ratio of half-lives ($b_t/a_t$) being at least 7 and up to 20 wherein $a_t$ is the half-life of (a) and $b_t$ is the half-life of (b), a total content of the organic peroxides being 0.1 to 0.9 part by weight per 100 parts by weight of said base rubber, and an organosulfur compound in an amount of 0.2 to 5 parts by weight per 100 parts by weight of the base rubber, wherein the polybutadiene has a polydispersity index Mw/Mn of 2.0 to 8.0 wherein Mw is a weight average molecular weight and Mn is a number average molecular weight, wherein the processing aid comprises a mixture of compounds of higher fatty acid metal salts represented by RCOOM, wherein the number of carbon atoms in R is at least 1 and up to 31 and the mixture has the melting range of 60 to 115° C., and wherein the solid core has a deflection of 2.0 to 6.0 mm under an applied load of 100 kg.

2. The golf ball of claim 1 wherein the metal salt of higher fatty acid has at least 12 carbon atoms and up to 31 carbon atoms.

3. The golf ball of claim 1 wherein the metal salt of higher fatty acid primarily comprises a metal salt of saturated fatty acid.

4. The golf ball of claim 1 wherein the metal salt of higher fatty acid primarily comprises a metal salt of unsaturated fatty acid.

5. The golf ball of claim 1 wherein the metal salt of higher fatty acid primarily comprises a zinc salt of higher fatty acid.

6. The golf ball of claim 1 wherein said processing aid is compounded in an amount of 2 to 30 parts by weight per 100 parts by weight of the base rubber.

7. The golf ball of claim 1 wherein the base rubber contains at least 60% by weight of the polybutadiene synthesized using a rare-earth catalyst.

8. The golf ball of claim 1 wherein said processing aid has a melting point of 80 to 105° C.

9. The golf ball of claim 1 wherein said polybutadiene has a Mooney viscosity ($ML_{1+4}$ (100° C.)) of at least 54.

10. The golf ball of claim 1 wherein the amount of said processing aid is at least 5 parts by weight.

11. The golf ball of claim 1 wherein the processing aid comprises zinc salts of high-molecular-weight fatty acids containing mainly saturated fatty acids, and the processing aid has a melting range of 99 to 107° C.

12. The golf ball of claim 1 wherein the processing aid comprises zinc salts of higher molecular fatty acids, and the processing aid has a melting range of 98 to 104° C.

13. The golf ball of claim 1 wherein the processing aid comprises a combination of zinc salts of high-molecular-weight fatty acids and the processing aid has a melting range of 94 to 110° C.

14. The golf ball of claim 1 wherein the processing aid comprises a combination of zinc salts of unsaturated fatty acids and the processing aid has a melting range of 75 to 87° C.

* * * * *